Nov. 1, 1932.    R. A. COLE    1,885,233
FLUID PRESSURE OPERATED STEADYREST
Filed Feb. 10, 1926
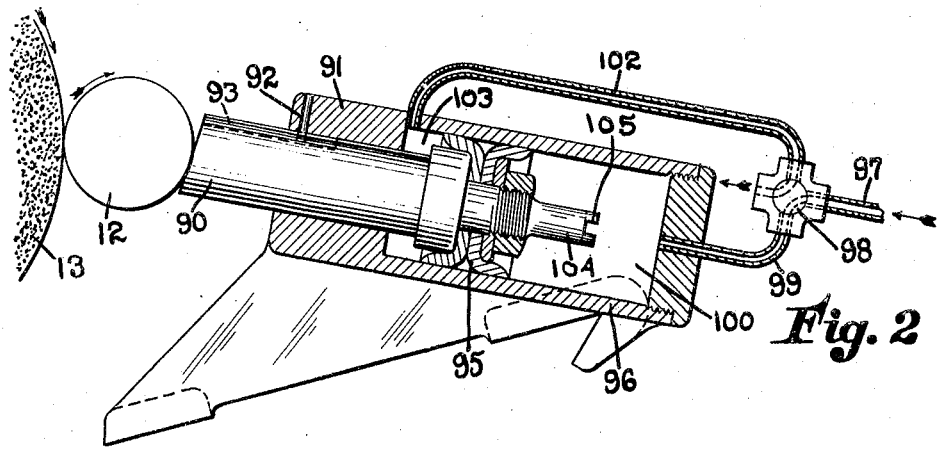
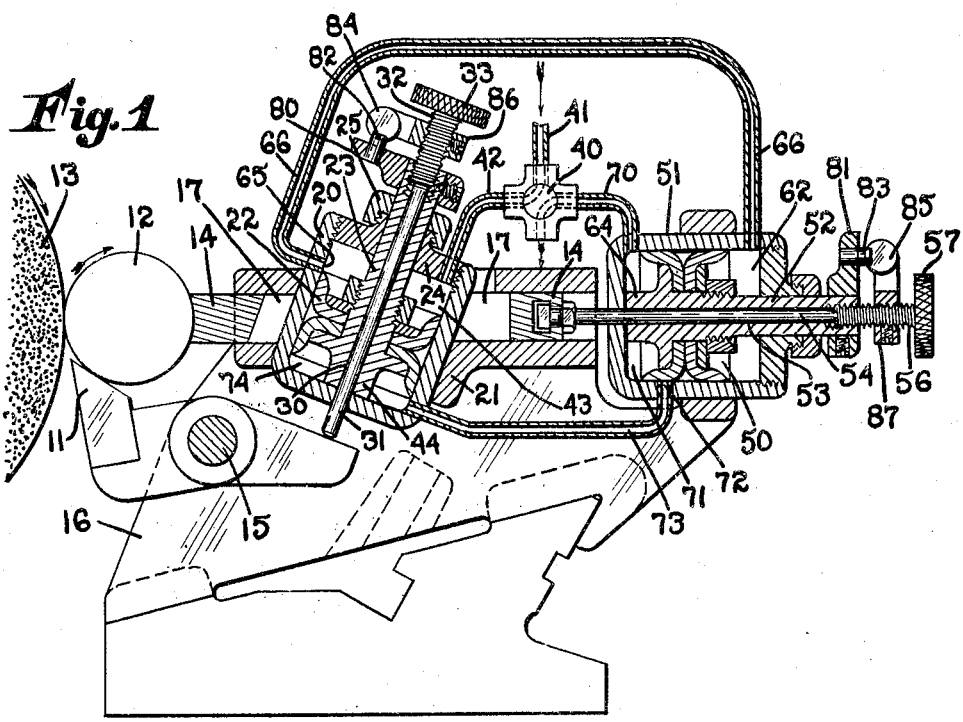
Witness
Harold W. Eaton
Inventor
Raymond A. Cole
By Clayton R. Jenks
Attorney Patented Nov. 1, 1932

1,885,233

UNITED STATES PATENT OFFICE

RAYMOND A. COLE, OF WORCESTER, MASSACHUSETTS, ASSIGNOR TO NORTON COMPANY, OF WORCESTER, MASSACHUSETTS, A CORPORATION OF MASSACHUSETTS

FLUID PRESSURE OPERATED STEADYREST

Application filed February 10, 1926. Serial No. 87,414.

My invention relates to a steadyrest for grinding machines and more particularly to a steadyrest which is automatically controlled by a fluid pressure mechanism to support the work during the grinding operation.

Heretofore, various steadyrests have been designed for supporting long cylindrical work of relatively small cross section to prevent the work from springing out of axial alignment during the grinding operation under the pressure or thrust of the grinding wheel, and to prevent vibration and the consequent formation of chatter marks on the surface of the work. The accurate adjustment of the shoes of such steadyrests depend largely upon the skill of the operator in so turning the adjusting screws as not to spring the work out of axial alignment as the steadyrest shoes are advanced to take care of a reduction in the size of the work. Several attempts have been made to design automatic steadyrests, but none of these has been wholly satisfactory in view of difficulties experienced in adjusting and setting up the rests for a given operation.

Most steadyrests depend largely upon the skill of the operator to continually adjust and maintain the steadyrest shoes in contact with the work at the proper pressure against the surface of the work during the grinding operation to maintain the axis of the work in correct alignment. It is one object of my invention to overcome this difficulty and to provide a steadyrest of the two bearing shoe type which is automatically controlled by a fluid pressure device arranged to move the shoes with a constant pressure toward the work as the latter is reduced in size.

It is another object of my invention to provide a steadyrest which, after it has been set up for a given operation, requires no attention on the part of the operator during the grinding operation.

In a steadyrest of the two bearing shoe type, it is essential that the lower shoe, which contacts with the work at a point adjacent the grinding wheel, be brought into operative position before the horizontally movable front shoe is moved into contact with the work. It is a further object of my invention to so construct a pneumatic steadyrest of the two bearing type that the control mechanism automatically moves the lower shoe into contact with the work to take up the thrust of the grinding wheel before the secondary control mechanism operates to move the horizontal shoe.

It is a further object of my invention to so construct my steadyrest that it may be manually adjusted independently of the pneumatic control to position the steadyrest shoes' relative to the work in adjusting them for any given operation.

Further objects will be apparent from the following disclosure.

In the drawing in which like reference numerals indicate like parts:

Figure 1 is an end view partly shown in section of my two bearing type pneumatically operated rest having the air piping shown diagrammatically to clarify the operation of the rest; and Fig. 2 is a similar end view partly shown in section of a modified construction of a single bearing shoe rest.

In accordance with my invention, I provide a steadyrest for grinding machines with an automatically operated mechanism to maintain the bearing shoes in contact with the surface of the work at a uniform pressure during the grinding operation so that any vibration or springing of the work out of axial alignment is prevented, thereby reducing chatter marks on the finished work to a minimum. I may apply my mechanism to any of the well known types of steadyrests but in my preferred construction, I utilize a steadyrest of the two bearing type. This comprises a fluid pressure device operatively connected with the shoes which is preferably so arranged that the shoes may be adjusted relative to the work independently of each other, for setting up the steadyrest for different sizes of work.

In my preferred arrangement, the automatic mechanism is so constructed that the lower bearing shoe is moved into contact with the work at a point adjacent to the line of contact between the grinding wheel and work before the horizontally movable shoe is moved into operative contact with the work. The lower shoe is at all times during the grinding operation retained against the surface of the work with a sufficient pressure tending to spring the work outwardly away from the surface of the grinding wheel and thereby preventing any tendency of the work to spring toward the grinding wheel. Likewise on withdrawal of the shoes after the work has been reduced to the desired size, it is preferable that the horizontal shoe be removed from operative contact with the surface of the work before the lower shoe is withdrawn.

As illustrated, I have shown a steadyrest of the two bearing shoe type having a lower bearing shoe 11 supporting the work 12 at a point below the work and adjacent to the line of contact between the work and the operative face of the grinding wheel 13. The horizontally movable shoe 14 is positioned to contact with the work at a point substantially opposite the line of contact between the work and the grinding wheel. The surface of the shoe 11 is preferably at an angle so that it bears against the work at a point as near as possible to the line of contact between the grinding wheel and work so that the shoe tends to hold the work away from the operative face of the grinding wheel to prevent the horizontally movable shoe from forcing the work out of axial alignment and into the grinding wheel. The bearing shoes 11 and 14 may be mounted in any suitable way on the frame 16, but in my preferred construction, I mount the shoe 11 on the pivot pin 15 for a swinging movement toward and from the work so as to permit the shoe to contact with the surface of the work adjacent the line of contact between the grinding wheel and the work. The shoe 14 is preferably mounted on the frame 16 for a sliding movement toward and from the work in substantially a horizontal plane.

To move the bearing shoes toward the work as the grinding wheel reduces it in size, I utilize a fluid pressure mechanism for automatically advancing the shoes as the work is ground, and I preferably employ a pneumatically operated manually controlled mechanism which automatically advances the shoes and maintains them with a uniform pressure against the operative surface of the work during the grinding operation. To move the shoe 11, I mount a pneumatic cylinder 20 in the portion 21 of the frame 16. A pistion 22 of suitable construction is arranged to slide longitudinally within the cylinder. The outer end of the piston rod 23 has a bearing in the cylinder head 24 and is provided with the usual packing box 25 to maintain an air tight joint as the piston slides within the cylinder. The piston rod 23 is provided with a central opening 30 having an adjusting rod 31 therein which has a threaded portion 32 at its upper end to engage corresponding threads in the upper end of the piston rod 23. The lower end of the adjusting rod 31 is positioned to bear against the inner portion of the shoe 11 to move the same toward and from the work. The operator may turn the knurled head 33 to adjust the rod 31 relative to the piston and thereby position the shoe 11 as desired.

The steadyrest shoe 14 has a substantially horizontal sliding movement relative to the frame 16 and is operatively connected to a suitable piston 50 fitting within the cylinder 51 which is supported in the frame 16. The piston 50 likewise has a piston rod 52 having a central opening 53 which is threaded and adapted to receive the adjusting rod 54. The adjusting rod 54 has a screw threaded portion 56 at its outer end and a knurled portion 57 to turn the same. The inner end of the rod 54 is connected to the end portion of the bearing shoe 14.

The shoes 11 and 14 contact with the work on opposite sides of the work center so as to oppose the thrusts of one another. As illustrated in Fig. 1, the bearing shoe 14 has an elongated slot 17 of sufficient size to surround the cylinder 20 and having sufficient clearance to permit the shoe 14 to slide toward and from the work through the desired distance. By utilizing this construction, both shoes are positioned so that they contact with the work substantially opposite each other and the grinding wheel, and each shoe receives the direct thrust of a fluid pressure mechanism to hold them against the surface of the work.

In order to operate this device, I utilize air under pressure obtained from any suitable source of supply, and preferably regulated, as by means of a pressure regulating device and a throttle valve, to give a constant and desired pressure to control the rate of movement of the shoes. This air is admitted to the cylinders through a supply pipe connected thereto by a suitable valve mechanism. The inlet and outlet openings to the cylinders are so arranged that shoe 11 moves before shoe 14. As shown, the air valve 40 is arranged to admit air from the inlet pipe 41 through the pipe 42 into the chamber 43 in the cylinder 20, whereby it forces the piston 22 downwardly until the work shoe 11 engages the surface of the piece of work to be ground. By this time, the port 65 in the cylinder 20 has been uncovered or opened by the downward movement of the piston 22 and permits compressed air to pass through the pipe 66 into the chamber 62 of the cylinder 51 and moves the piston 50 inwardly to bring the bearing shoe 14 into operative contact with the surface of the work 12. The two shoes 11 and 14 will then bear against the surface of the work during the grinding operation. The downward movement of the pistons continues until the projections 44 and 64 of the pistons 22 and 50 respectively contact with the bottom of their respective cylinders 20 and 51. The shoes 11 and 14 should be adjusted so that when the pistons have reached the bottoms of the cylinders, the work has been reduced to the desired size. The operator, by turning the valve 40 to its opposite or reverse position, reverses the direction of flow of the air and passes it through the pipe 70 into the chamber 71 of the cylinder 51 to move the piston 50 outwardly and thereby remove the shoe 14 from contact with the work. The lower shoe 11 is held in its operative position until the horizontal shoe has been moved out of operative contact with the surface of the work. As the piston 50 moves outwardly to remove the shoe 14 from contact with the work, it opens a port 72 in the wall of the cylinder 51 and permits air to pass through the pipe 73 into the chamber 74 in the lower portion of the cylinder 20, thereby forcing the piston 22 upwardly to move the lower bearing shoe 11 out of contact with the surface of the work. The shoe 11 is so constructed that the outer portion of the bearing shoe is of sufficient weight to overbalance and maintain the inner end of the arm at all times in contact with the lower end of the adjusting rod 31.

To limit the manual adjustment of the rods 31 and 54 in one direction, I provide a pair of supporting members 80 and 81, fitted to the outer ends of the piston rod 23 and 52 respectively, and locked in position on the rods by set screws. These members are provided with the stop pins 82 and 83 respectively positioned in the paths of the stop screws 84 and 85. These stop screws are carried by the clamping members 86 and 87 which are screw threaded onto the threaded portions 32 and 56 of the rods 31 and 54 respectively. By turning the members 86 and 87 relative to the screw threaded portions 32 and 56, the stopping point of each adjusting rod may be varied to limit the inward manual adjustment of the shoes. The members 86 and 87 are each provided with a clamping screw so that they may be locked in adjusted position to the rods 31 and 54. These stops are particularly adapted for use where it is desired to manually adjust the rest to limit the inward movement of the bearing shoes. This steadyrest, as illustrated in Fig. 1, is particularly adapted for supporting or steadying long pieces of cylindrical work having a relatively small cross section to prevent the axis of the work springing out of alignment and to prevent chatter marks on the surface of the work.

If it is desired to remove the shoes 11 and 14 from the surface of the work during the grinding operation to caliper or gauge the work, it is merely necessary for the operator to turn the air control valve to change the direction of flow of the air. The shoes will move rapidly away from the work and give the operator ample space to caliper or gauge the work. This feature is desirable in machines where a straight in-feed of the grinding wheel, such as machines for grinding crankshafts, as it is frequently necessary to measure or caliper the crankpins. After the operator has calipered the work, a partial turn of the air control valve returns the shoes into operative contact with the surface of the work and the grinding operation may then be continued.

In certain types of work of shorter lengths it is desirable to have some support to steady the work and to dampen vibration and prevent chatter marks, consequently I have illustrated a modified construction in Fig. 2 comprising a single work bearing shoe 90 contacting with the surface of the work 12 slightly below a horizontal plane passing through the line of contact between the grinding wheel and the axis of the work. This shoe 90 is slidably mounted in the frame 91 and is prevented from turning by means of a key 92 mounted in the frame 91 engaging a keyway 93 in the shoe 90. The outer end of the shoe 90 is connected with a piston 95 slidably mounted in the pneumatic cylinder 96 which is part of the main frame 91 of the steadyrest. Air is admitted through a supply pipe 97 to a two-way valve 98. To bring the steadyrest shoe 90 into operative contact with the work at the starting of the grinding operation, the operator turns the valve 98 to admit air through the pipe 99 into the chamber 100 to force the bearing shoe 90 with a uniform pressure against the surface of the work. When the work has been reduced to a desired size, the two-way valve 98 may be manually turned to reverse position so as to admit air through the pipe 102 into the chamber 103 to remove the steadyrest shoe from contact with the work. The projection 104 of the piston 95 acts as a stop to limit the rearward movement of the shoe 90. The end of the projection 104 has a slot 105 so that when in its rearward position air may be admitted into the chamber 100. This modified construction acts as a dampening steadying device to prevent vibration of the work and reduce chatter marks to a minimum.

In the operation of my steadyrest, the operator inserts the first piece of work in the machine and then turns the air valve 40 to admit air through a pipe as above described, to move the shoes 11 and 14 into contact with the work. The first piece of work may then be ground to the desired size by manually adjusting the shoe by turning the adjusting screws 33 and 57 so that when the projections 44 and 64 of the pistons 22 and 50 respectively contact with the bottom of their respective cylinders, the shoes 11 and 14 will contact with the finished work. The members 86 and 87 should next be adjusted so that stop screws 84 and 85 contact with pins 82 and 83 respectively. The steadyrest is now in adjustment and the shoes properly positioned for operation on production work. To remove the shoes from the work, the operator turns the air control valve to the reverse position as above described and the shoes are automatically moved to their inoperative position. The horizontally movable shoe moves away from the work before the lower shoe, so that the work is at all times supported against any motion toward the grinding wheel. On succeeding operations, the operator merely inserts a new piece of work into the machine and starts the machine into operation and then turns the air valve to admit air to the steadyrest cylinders, and the shoes are automatically brought into contact with the work and maintained in contact at a uniform pressure.

In certain grinding operations, it may be desirable to use the fluid pressure piston and cylinder mechanism merely to position the steadyrest shoes 11 and 14 into a desired relation with the rough piece of work which is to be ground, and then to move the steadyrest shoe into proper contact with the work or to maintain it there after it has been brought into contact with the work by the fluid pressure mechanism. This is done by manually adjusting the screws 33 and 57 which move the shoes relative to and independent of movement of the pistons. For example, when the pistons have been moved until their projections 44 or 64 contact with the bottoms of the cylinders 20 and 50 respectively, the operator may then turn the adjusting screws 33 or 57 and move the steadyrest shoes as desired. By operating the rest in this manner, it is possible to adjust the shoes roughly by means of the pistons and then finely by hand. If the machine is operated in this manner, it is necessary for the operator, at the end of each grinding operation, to turn the manually adjustable screws in the opposite direction to readjust or reset the steadyrest shoes relative to the fluid pressure mechanism so that on the next movement of the steadyrest shoes they will be positioned in the proper relation to start the grinding operation. If the fluid pressure mechanism is used alone to control the movement of the shoes, such readjustment is not necessary.

Having thus described my invention, what I claim as new and desire to secure by Letters Patent is:

1. A steadyrest comprising a frame having a flat surface arranged to mate with and be removably mounted on the top of the work table of a grinding machine, a steadyrest shoe movably mounted on said frame which is adapted to engage the surface of the work, a fluid pressure device including a cylinder and piston on said frame, and connecting means interposed between and connected to the piston and shoe to control the movement of the shoe toward and from the work.

2. A steadyrest for grinding machines comprising a frame arranged to be mounted on the machine table, a steadying shoe movably mounted on said frame adapted to engage the surface of the work, a fluid pressure device including a cylinder and piston on said frame, and connecting means interposed between and connected to the piston and shoe to control the movement of said shoe toward and from the work and fine precision means for adjusting the position of the shoe relative to the piston.

3. A steadyrest for grinding machines comprising a frame having means for removably positioning the frame on the machine table, a work shoe movably mounted in said frame, a fluid pressure cylinder and a piston, one of which is mounted on said frame and the other is operatively connected to said shoe, means to admit fluid pressure to one side of said piston to move said shoe towards the work and adjusting means to limit the movement of the shoe towards the work.

4. A self-contained steadyrest unit for a grinding machine comprising a frame, means for removably mounting the frame on the machine, a work steadying shoe movably mounted thereon, a fluid pressure device including a movable piston, an adjustable screw operatively connected to the piston and movable therewith, means connecting the screw with the shoe to move the same, said screw serving to adjust the position of the shoe relative to the piston, and means for admitting fluid to said device and moving the shoe relative to the work.

5. A self-contained steadyrest unit for a cylindrical grinding machine comprising a frame, means for removably fastening the frame to the machine, a work steadying device including two work engaging shoes, one engageable with the lower portion of the work and the other opposite to the grinding wheel, means for movably supporting the shoes on the frame, a fluid pressure operated mechanism on the frame, and connections between said mechanism and the shoes for moving the shoes relative to the work.

6. A self-contained steadyrest unit for grinding machines comprising a frame, means for removably fastening the frame to the machine, a work supporting shoe movably mounted on said frame in a position adapted to support the work solely from below and on the side adjacent to the grinding wheel, a fluid pressure operated device having a piston, and means connecting the piston to said shoe and serving to hold the shoe in contact with the work at a uniform pressure during the grinding operation.

7. A steadyrest for grinding machines comprising a steadyrest frame, a pair of work supporting shoes mounted on said frame which are arranged to steady the work during grinding, one of said shoes being arranged to take the cutting thrust of the grinding wheel and the other shoe arranged to take the feeding thrust thereof, and individual fluid pressure motors to separately actuate said shoes.

8. A steady rest for grinding machines comprising a frame, a pair of work supporting shoes mounted on said frame arranged to contact with and steady the work during a grinding operation, means including two fluid pressure cylinder and piston devices, each operatively connected to one shoe, to move the shoes towards the work, and means for independently adjusting the position of each shoe relative to the work.

9. A steadyrest for grinding machines comprising a frame, a lower supporting shoe arranged to contact with the work adjacent to the grinding wheel, a horizontal shoe arranged to contact with the work on the opposite side from the grinding wheel and means including fluid pressure actuated pistons to automatically move said shoes, the first mentioned shoe being brought into operative contact with the work before the second shoe moves into its operative position.

10. A steadyrest for grinding machines comprising a frame, a lower work supporting shoe arranged to contact with the work adjacent to the grinding wheel, a horizontal shoe arranged to contact with the work on the opposite side from the grinding wheel, and two fluid pressure operated piston and cylinder devices operatively connected to the shoes to move them towards the work and having inlet and outlet ports and connections between said cylinders so constructed and arranged that the piston connected with the lower shoe moves to bring said shoe into contact with the work before the inlet port in the horizontal shoe cylinder is opened to admit fluid under pressure in the horizontal shoe cylinder and move the latter into engagement with the work.

11. A steadyrest for grinding machines comprising a frame, a lower work supporting shoe arranged to contact with the work near the grinding wheel, a horizontal shoe arranged to contact with the work on the opposite side from the grinding wheel, and two pneumatically operated cylinder and piston devices operatively connected to the shoes to move them towards the work and having inlet and outlet ports and connections between said cylinders so constructed and arranged that the piston connected with the lower shoe moves to bring said shoe into contact with the work before the inlet port in the horizontal shoe cylinder is opened to admit air in the horizontal shoe cylinder and move the horizontal shoe into contact with the work.

12. A steadyrest comprising a frame arranged to be mounted on a grinding machine table, a work steadying shoe movably mounted on the frame, a fluid operated device to move the shoe relative to the work, and manually operable means to move the shoe relative to the work independently of the fluid pressure operated device.

13. A steadyrest comprising a frame arranged to be removably mounted on a grinding machine table, a work steadying shoe movably mounted thereon, a fluid pressure operated device to move the shoe toward the work, an adjustable stop to limit the forward movement of the shoe and manually operable means to move the shoe independently of the fluid pressure operated device.

14. A steadyrest for grinding machines comprising a frame, a lower supporting shoe arranged to contact with the work adjacent to the grinding wheel, a horizontal shoe arranged to contact with the work on the opposite side from the grinding wheel and means including fluid pressure actuated pistons to automatically move said shoes, and means to control the fluid pressure to actuate said pistons.

Signed at Worcester, Massachusetts, this 9th day of February 1926.

RAYMOND A. COLE.